United States Patent [19]

Kato

[11] Patent Number: 4,647,771
[45] Date of Patent: Mar. 3, 1987

[54] OPTICAL MOUSE WITH X AND Y LINE PATTERNS ON SEPARATE PLANES

[75] Inventor: Takaaki Kato, Nagano, Japan

[73] Assignee: Nissin Kohki Co. Ltd., Nagano, Japan

[21] Appl. No.: 678,524

[22] Filed: Dec. 5, 1984

[30] Foreign Application Priority Data

Dec. 5, 1983 [JP] Japan .................. 58-229500
May 25, 1984 [JP] Japan .................. 59-106115

[51] Int. Cl.⁴ .............................................. H01J 3/14
[52] U.S. Cl. ................................ 250/237 R; 250/229; 340/710
[58] Field of Search ............ 33/1 M, 125 C; 250/229, 250/331 SE, 237 G; 340/347 P, 710; 356/395

[56] References Cited

PUBLICATIONS

IBM Technical Disclosure Bulletin, vol. 27, No. 10B, Mar. 1985.

IBM Technical Disclosure Bulletin, vol. 28, No. 3, Aug. 1985.

Primary Examiner—Eugene R. LaRoche
Assistant Examiner—James C. Lee
Attorney, Agent, or Firm—Sughrue, Mion, Zinn Macpeak & Seas

[57] ABSTRACT

An optical mouse for inputting a cursor position including first and second line patterns formed on opposite surfaces of a transparent substrate, with the lines of the first and second line patterns being perpendicular. The line patterns are illuminated by a light source in the movable mouse body, which also includes an optical system and detecting elements for separately detecting light reflected from the first and second patterns. Because the first and second line patterns are located at different distances from the optical system, light reflected from the two patterns can be separately focused to prevent interference between the two patterns.

14 Claims, 10 Drawing Figures

OPTICAL MOUSE WITH X AND Y LINE PATTERNS ON SEPARATE PLANES

BACKGROUND OF THE INVENTION

The present invention relates to an optical mouse for moving a cursor appearing on the screen of a CRT (cathode-ray tube) display.

A cursor position instructing unit called a "mouse" is available for freely moving a cursor on a CRT screen in the direction of X and Y axes. As the mouse is moved about on a flat plate called a "mouse pad", the cursor is moved in the direction of the X and Y axes in coincidence with the movement of the mouse.

Examples of a conventional mouse are a mechanical mouse disclosed by Japanese Published Utility Model Application No. 7467/1979 and an optical mouse disclosed by Japanese Patent Application No. 500777/1983.

The mechanical mouse is designed so that a ball rotatably provided in the mouse body is rolled in the direction of the X and Y axes by moving the mouse on a table. The cursor is moved in the directions of the X and Y axes according to the amounts of rotation of an X-axis direction detecting ring and a Y-axis direction detecting ring which rotate in frictional contact with the ball.

On the other hand, in the optical mouse, line detectors composed of light-emitting elements and light-detecting elements are employed to read a grid pattern of vertical and horizontal lines of different colors, for instance, a grid pattern having green lines extending in the direction of the X axis and red lines extending in the direction of the Y axis.

In more detail, the mechanical mouse includes a ball which is rolled on the mouse pad, at least two detecting rings operated in association with the ball, and a device for converting the rotations of the detecting rings into electrical signals. As a result, the mechanical mouse is disadvantageous in that it is intricate in construction and in that the accuracy of its mechanical components and their assembly must be high. On the other hand, in the optical mouse, two groups of lines of different colors are used to distinguish the directions of the X and Y axes from each other, and two light source or filters of different colors must be provided to read the two groups of lines. The two groups of lines are formed on the same surface and are separately detected by a time-division method whereby the light sources and the light-detecting elements are operated alternately and in a synchronized manner. Therefore, the optical mouse is also disadvantageous in that it is intricate in construction and high in manufacturing cost. Furthermore, since the directions of the X and Y axes are detected in a time-division manner, if the speed of movement of the mouse is too high, it may not be possible to count the lines correctly, and hence errors are caused in reading the lines.

The movement of the mouse on the pad is in proportion to the movement of the cursor on the CRT screen. The movements of the mouse and the cursor are two dimensional, and therefore the positions of the mouse and the cursor can be geometrically determined in X-Y coordinates. The position of the mouse on the mouse pad is determined by the number of lines counted in the direction of the Y axis, while the position of the cursor is determined on the CRT screen in correspondence to the position of the mouse.

If the line pattern indicating the direction of the X axis and the line pattern indicating the direction of the Y axis are on the same surface, the mouse cannot distinguish a signal obtained by counting the lines in the direction of the X axis and a signal obtained by counting the lines in the direction of the Y axis from each other without making the line patterns different in color, reflectivity, or the like. Especially when the direction of movement of the mouse on the pad is changed by 90° it is difficult to correctly count the lines. This difficulty can be alleviated by making the line pattern in the direction of the X axis and the line pattern in the direction of Y axis different in reflectivity. According to this method, changes of the direction of movement of the mouse can be detected from the difference in reflectivity between the line patterns due to the difference between the quantities of light reflected from the two line patterns. However, in converting the difference between the quantities of light into an electrical signal, it is impossible to convert it directly into a digital signal. Therefore, the practice of this method requires an intricate signal processing technique whereby the difference is converted into an analog signal and the analog signal thus obtained is converted into a digital signal.

SUMMARY OF THE INVENTION

An object of the present invention is thus to provide an optical mouse in which the above-described difficulties accompanying a conventional optical mouse have been eliminated.

An optical mouse according to the invention comprises a first line pattern provided on a first surface for detecting movement in a first direction, the first line pattern consisting of thin parallel lines which can be optically detected; a second line pattern provided on a second surface spaced a predetermined distance from the first surface for detecting movement in a second direction perpendicular to the first direction, the second line pattern consisting of thin parallel lines which can be optically detected; means for illuminating the first and second line patterns; and a line pattern reading device including an optical system and detecting elements for separately detecting the first and second line patterns.

The optical mouse of the invention is composed basically of two structures: one is a mouse body incorporating a line reading device, and the other is a pad which has first and second line patterns which, when viewed from above, appears as a grid pattern having horizontal and vertical lines. In one example of the pad, its substrate is made of a glass plate or acrylic resin plate 3 to 6 mm in thickness which transmits light from the light source in the mouse. Two line patterns each consisting of thin parallel lines 0.4 to 0.6 mm in line width and spaced apart 0.4 to 0.6 mm are provided on both surfaces of the transparent pad oriented perpendicular to one another. It is desirable that the line patterns be composed of lines whose reflectivity is larger than the reflectivity of the transparent substrate under light from a light source such as an incandescent or light-emitting diode (located in the mouse body). For instance, if the transparent substrate is made of acrylic resin, the lines can be formed by vacuum depositing aluminum on the surface of the substrate. The reflectivity of acrylic resin is about 4% for rays near the visible region, while the reflectivity of aluminum is about 90%. Therefore, about 90% of the light applied to the pad is reflected by the lines, and only about 4% is reflected by the transparent parts between the lines. Accordingly, if light-detecting elements such as photodiodes are arranged in the paths of these reflected light beams, the lines can be readily detected due to the difference between the quantities of light received. By converting the difference to an electrical signal, the number of lines can be electrically counted, as a result of which the position of the mouse body on the pad can be detected.

The line detecting means in the mouse body includes optical systems which are focused on the line patterns on both sides of the pad to read the line patterns separately according to the directions of the X and Y axes. The optical system may be implemented with a convex lens having a focal length of 5 to 8 mm and a diameter of about 5 mm. Otherwise, a plurality of lenses may be used. In any event, the optical system should be optimized taking into account the positions of the line patterns and the light-detecting elements.

In the optical mouse of the invention, a line pattern for detecting the direction of the X axis is provided on one of two surfaces which are spaced vertically from each other, while a line pattern for detecting the direction of the Y axis is provided on the other surface, and the line patterns are read by respective line detecting means. Accordingly, the occurrence of errors in reading the directions of the X and Y axes can be completely eliminated. Furthermore, in the optical mouse of the invention, it is unnecessary to perform a time-division process whereby illumination and detection of the line patterns are carried out alternately. Accordingly, the optical mouse is considerably simple in construction when compared with the conventional one.

DESCRIPTION OF THE PREFERRED EMBODIMENTS

The invention will be described with reference to preferred embodiments shown in the accompanying drawings.

Figure 1:
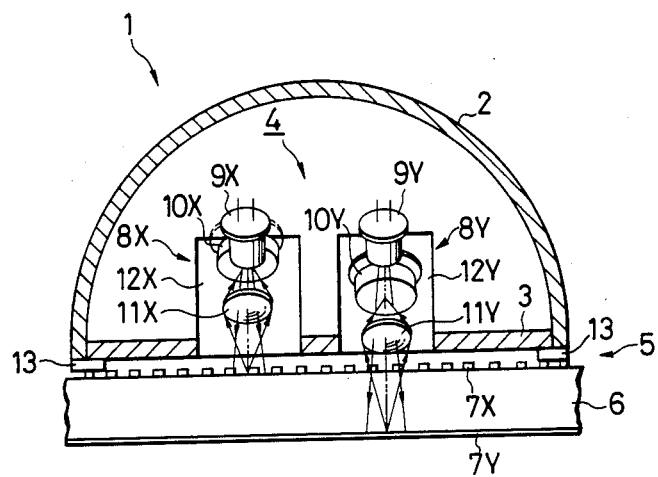
FIG. 1 is a sectional view showing an optical mouse constructed according to the invention.
Figure 2:
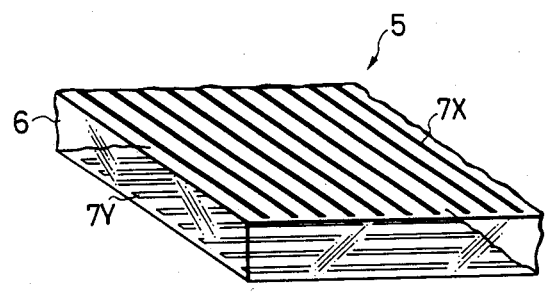
FIG. 2 is a perspective view showing a mouse pad on which the optical mouse is moved about.
Figure 3:
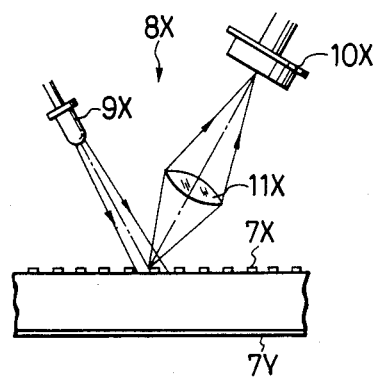
FIG. 3 is a side view showing an X-axis direction line pattern reading unit.
Figure 4:
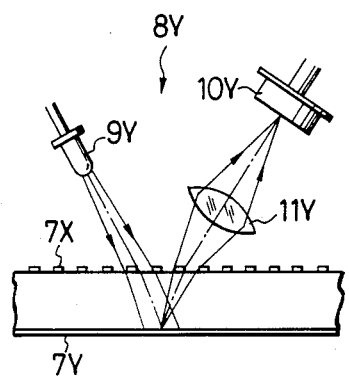
FIG. 4 is a side view showing a Y-axis direction line pattern reading unit.

As shown in FIG. 1, a mouse 1 includes a housing 2 in the shape of an inverted bowl, a bottom board 3 closing the opening of the housing 2, a line reading device 4 mounted on the bottom board 3, and a circuit board (not shown) for processing electrical signals outputted by the line reading device 4. A pad 5 includes a transparent substrate 6 and line patterns 7X and 7Y formed on opposite sides of the substrate 6. Each of the line patterns is made up of thin parallel lines.

The substrate 6 is 5 mm in thickness, 210 mm in width and 300 mm in length (substantially size "A4") and is made of acrylic resin. The line pattern 7X is used to instruct the cursor to move in the direction of the X axis. The parallel lines of the line pattern 7X are formed by printing, coating or vacuum evaporating light-reflecting material on the upper surface of the substrate in such a manner that the lines so formed extend in a direction perpendicular to the surface of the drawing. The width of each line and the distance between adjacent lines are both, in this example, 0.5 mm. The line pattern 7Y is used to instruct the cursor to move in the direction of the Y axis. The parallel lines of the line pattern 7Y, formed on the lower surface of the substrate by the same method as the line pattern 7X, form a 90° angle with those of the line pattern 7X. The resolving power of the mouse can be increased by reducing the width of each line and the distance between adjacent lines. However, the width and the distance should be of the order of 0.5 mm since the mouse is intended as a position instructing unit for moving the cursor on a CRT display and this value corresponds to the resolution of a typical CRT display.

Two line reading units 8X and 8Y provided in the housing 2 are fixedly securing to the bottom board 3. The line reading unit 8X includes a light source 9X for illuminating the line pattern 7X, a light-detecting element 10X for detecting the line pattern 7X, a lens 11X for forming the real image of the line pattern 7X on the light-detecting element 10X, and a supporting member 12 holding the light source, the light-detecting element and the lens in a predetermined positional relation. Similarly, the line reading unit 8Y is composed of a light source 9Y for illuminating the line pattern 7Y, a light-detecting element 10Y for detecting the line pattern 7Y, a lens 11Y for forming the real image of the line pattern 7X on the light-detecting element 10Y, and a supporting member 12Y holding the light source, the light-detecting element and the lens in a predetermined positional relation.

Each of the light sources 9X and 9Y is preferably a light-emitting diode having a sharp directivity and a high luminance. The wavelength thereof may be in the visible region or the near-infrared region.

The focal point of the lens 11X is on the upper surface of the pad where the line pattern 7X is provided, and the focal point of the lens 11Y is on the lower surface of the pad where the line pattern 7Y is provided. Accordingly, when the line pattern 7X is read through the lens 11X, the reading of the line pattern 7X is not disturbed by the line pattern 7Y because the line pattern 7Y is out of the focal plane of the lens 11X. Similarly, when the line pattern 7Y is read through the lens 11Y, reading the line pattern 7Y is not disturbed by the line pattern 7X because the line pattern 7X is out of the focal plane of the lens 11Y.

Three sliders 13 made of "Teflon" (trademark), nylon or silicon resin (having a small coefficient of friction with respect to the upper surface of the pad 5) are provided on the lower surface of the housing 2. As the housing 2 is supported at three points, the mouse body will not vibrate with respect to the pad and can be moved in a correct posture at all times.

In the above-described embodiment, each of the line reading units is provided with its own light source.

Figure 5:
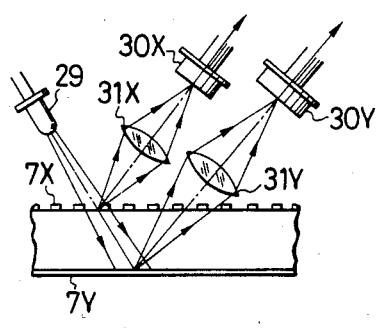
FIG. 5 is a side view showing a modification of a line pattern reading device including the line pattern reading units shown in FIGS. 3 and 4.

However, one of the light sources may be eliminated by modifying the optical mouse as shown in FIG. 5. In the modification, the line patterns 7X and 7Y are illuminated by one light source 29, and the images of the line patterns 7X and 7Y are formed on the light-detecting elements 30X and 30Y by the lens 31X and 31Y, respectively.

In the case of FIG. 5, the optical axis of the light source and the optical axes of the lenses are in one plane, while in the case of FIG. 1, the plane which includes the optical axis of the light source 9X and the optical axis of the lens 11X is parallel to the plane which includes the optical axis of the light source 9Y and the optical axis of the lens 11Y. However, the directions of the optical axes of the lenses are not limited to those which are illustrated in FIGS. 1 or 5.

As shown in FIG. 1, the line pattern 7X on the upper surface of the pad 6 is located between the line pattern 7Y on the lower surface of the pad 6 and the lens 11Y. Therefore, when the line pattern 7Y is read through the lens 11Y, a clear image of the line pattern 7Y and a defocused image of the line pattern 7X are applied to the light-detecting element 10Y. The line pattern 7X is optically shifted from the focal plane of the lens 11Y by a distance equal to the thickness of the pad, and therefore the line pattern 7X will not be read by the reading unit 8Y, although it may produce optical noise in the reading unit 8Y. If the pad is made especially thin, it is impossible to completely eliminate the effect of the line pattern 7X on the reading unit 8Y. However, the effect may be reduced by setting the width of each line and the distance between adjacent lines to suitable values, for instance, 0.3 mm and 0.7 mm, respectively. It goes without saying that the ratio of the width of each line to the distance between adjacent lines should be determined according to the capabilities of the reading unit 8X.

Another approach to noise reduction is to decrease the reflectivity of the line pattern on the upper surface of the pad. If the line pattern 7X is made of a semitransparent film having a reflectivity of 30 to 40% and which is formed by vacuum depositing aluminum, the effect of the line pattern 7X on the reading unit 8Y can be reduced. The reflectivity of the pad substrate is typically about 4%, which is much smaller than the reflectivity of the line pattern, namely, about one-tenth. Therefore, the light-detecting element can sufficiently detect the difference between the quantities of light reflected from the line pattern and the pad substrate.

Figure 10:
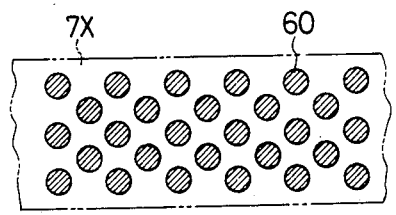
FIG. 10 is a plan view showing modification of the line pattern according to the invention.

Further, as shown in FIG. 10, the line pattern 7X may be made semitransparent by dotting minute or fine reflex points 60 having an extremely high reflectivity. In this case, the reflectivity of the line pattern may be freely changed by changing a shape and an occupation of the above-described reflex points. In the embodiment shown in FIG. 10, the circular reflex points of 0.1 mm diameter are dotted with a reflectivity of 90%.

Because the mouse is moved about on the upper surface of the pad, the line pattern on the upper surface may be worn or the reflectivity may be changed. In order to eliminate these difficulties, it is preferable to provide a thin transparent protective film over the upper surface of the pad on which the mouse is moved. Alternatively, a transparent film having the line pattern on its lower surface can be bonded to the upper surface of the pad substrate with a transparent adhesive.

Figure 6:
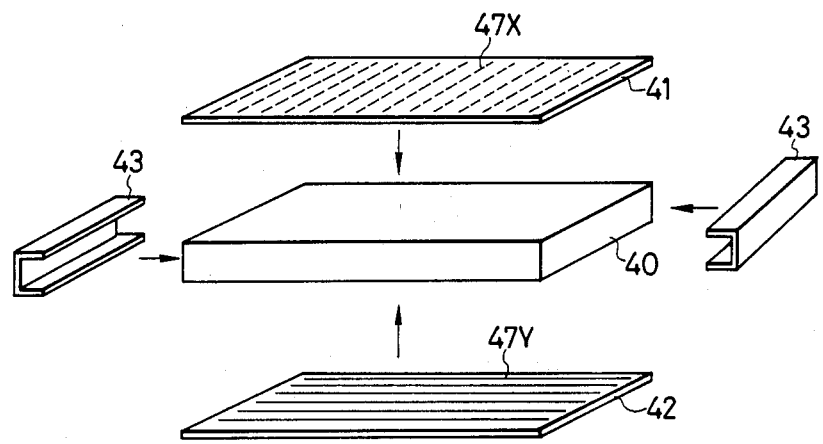
FIG. 6 is an exploded perspective view showing a modification of the mouse pad.

FIG. 6 shows a modification of the mouse pad. A thin plate 41 having a line pattern 47X and a thin plate 42 having a line pattern 47Y are laid over the upper surface and the lower surface of a transparent pad substrate 40 of glass or acrylic resin. The thin plate 41 is preferably a transparent polyester film 0.1 to 0.3 mm in thickness. The line pattern 47 which reflects light is formed on the lower surface of the thin plate 41. The thin plate 42 is preferably an aluminum film 0.2 to 0.3 mm in thickness having a high reflectivity factor. The line pattern 47Y is printed on the upper surface of the thin plate 42. The line pattern 47Y has a low reflectivity, being semigloss black for instance. Since the provision of thin lines of low reflectivity on a surface of high reflectivity is equivalent to the provision of thin lines of high reflectivity on a surface of low reflectivity, the line pattern on the lower surface of the pad substrate may be formed as lines of high reflectivity formed on a surface of low reflectivity.

The pad substrate 40 and the thin plates 41 and 42 are of the same size (for instance, size "A4"), and are assembled together with two holders 43 and 43 U-shaped in section at both ends, as shown in FIG. 6.

The mouse is moved over the upper surface of the pad, which accordingly may be scratched to the extent that its transparency is lowered. Therefore, it is preferable that the thin plate on which the mouse is moved be detachably mounted on the pad substrate so that it can easily be replaced.

If the thin plate 41 is rigid to the extent that it is not bent by the downward pressure which is applied thereto when the mouse is moved about, the pad substrate may be eliminated. In this case, spacers are set between the thin plates 41 and 42 extending along the peripheral portions of the thin plates so that the thin plates 41 and 42 are uniformly spaced apart form each other.

Figure 7:
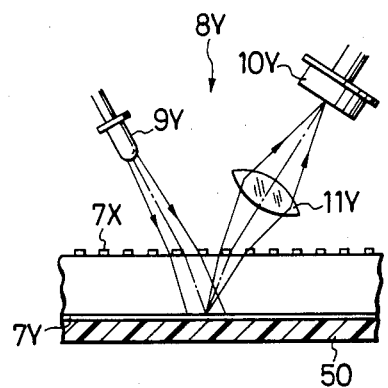
FIG. 7 is a side view showing another modification of the mouse pad.

It is preferable that, as shown in FIG. 7, the lower surface of the pad which has the second line pattern 7Y be covered with a light absorbing layer 50 such as a black paint layer, a black paper layer, or a black rubber layer. In this case, even if the optical mouse is used on a desk surface which reflects light, there will be no obstruction by the light from the light source which otherwise reaches the desk through the gaps between the lines of the second line pattern 7X and is reflected therefrom; that is, the optical noise can be greatly reduced.

Employment of a black rubber layer as the light absorbing layer 50 is practical because such prevents the substrate 6 from sliding on the desk surface.

Another embodiment of the invention which utilizes a light-emitting diode having a wavelength of about 950 nm in the near infrared region as a light source will now be described.

A mouse pad is generally used on a desk. In order to move the cursor on the CRT display to a desired position, the operator moves the mouse on the mouse pad while watching the CRT display. Therefore, the operator usually does not directly view the mouse pad while moving the mouse. However, depending on the position of the operator's eyes relative to the position of the mouse pad and to the positions of light sources such as a fluorescent lamp on the ceiling of the room, natural light coming in through windows, a lamp on the desk, etc., light from the light sources, being reflected by the line patterns of the mouse pad, may reach the operator's eyes. In this event, the unwanted light may disturb the operator and cause eye fatigue.

Figure 8:
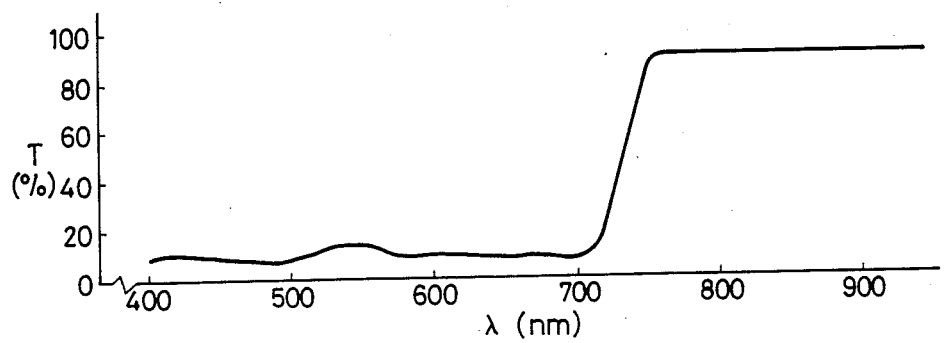
FIG. 8 is a graphical representation showing an example of the spectral transmissivity curve of the substrate of the mouse pad according to the invention.

In order to eliminate this difficulty, a mouse pad substrate is provided according to this embodiment of the invention which has a filtering effect to block rays having wavelengths in the visible region and to transmit near-infrared rays emitted by a light-emitting diode. More particularly, as shown in FIG. 8, the mouse pad substrate has a typical transmissivity of about 20% for rays in the visible region of from about 400 nm to about 770 nm in wavelength, and a transmissivity of 90% or more for rays in the infrared region higher than about 770 nm in wavelength. For this purpose, the mouse pad substrate can be made of a chocolate-colored acrylic resin plate.

The above-described filtering effect can be varied by changing the type and quantity of the coloring pigment and dye of the substrate. Therefore, the mouse pad substrate may be constructed by using not only the above-described chocolate-colored acrylic resin plate, but also by a plate which is formed by applying pigment or dye to a transparent plate such as a polycarbonate resin plate or glass plate.

The use of the mouse pad substrate described above has the following merit: Of the rays reflected from the line pattern 7Y on the lower surface of the substrate, rays in the visible region will not reach the operator's eye, being blocked by the filtering effect of the substrate. Even if the rays reach the operator's eyes, the amount thereof is extremely small. Thus, the difficulty of light reflected from the line pattern 7Y disturbing the operator is eliminated.

Adjustment is made so that the optical reflectivity of the line pattern 7X is about 20 to 40%, and that of the line pattern 7Y about 90%. The term "optical reflectivity" as herein used is intended to mean a reflectivity with respect to the wavelength (about 950 nm) of light emitted by a light source such as a light-emitting diode employed in the optical mouse.

Since the optical reflectivity of the line pattern 7X on the upper surface of the substrate is about 20 to 40% as described above, light reflected form the line pattern 7X will not greatly disturb the operator. However, in order to prevent the operator from being conscious of the line pattern, it is desirable to block the light reflected from the line pattern 7X as well.

Figure 9:
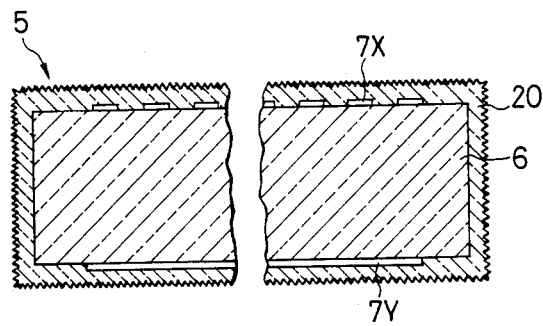
FIG. 9 is an enlarged sectional view showing part of the mouse pad which is covered with a protective film according to the invention.

Regular reflection by the line pattern 7X can be prevented by applying a semi-gloss film 20 capable of irregularly reflecting incident light from a light source to the surface of the line pattern 7X as shown in FIG. 9.

The preferred method of manufacturing the mouse pad includes a step in which, in order to protect line patterns formed by vacuum-depositing aluminum (such as may be done using a so-called "hard coating" method), the line patterns may be coated with a hardened film of organopolysiloxane or the like. The hardened film is applied to the plate material generally according to a so-called "pull method". According to the pull method, the pad substrate, i.e., the colored acrylic resin plate, is immersed in an undiluted solution of organopolysiloxane and is then slowly pulled upwardly. As a result, a transparent film 1 to 10 microns in thickness is formed on the surface of the substrate. Therefore, the substrate thus treated is heated and hardened so as to change the film into a glassy film which is considerably hard. Thus, a protective film is formed over the line patterns.

In order to provide the surface of the protective film with a microscopic roughness, amorphous fine particles (called "aerosols") of a material such as silica are mixed in the above-described undiluted solution. The fine particles remain in the protective film after the transparent film has been subjected to a heating and hardening treatment, and therefore the surface of the protective film becomes microscopically uneven to irregularly reflect incident light. Accordingly, light, for instance, from a lamp on the ceiling, is scattered by the uneven surface of the protective film, and therefore the operator's eyes receive only a defocused image of the line pattern and thus the operator's eyes will not be irritated thereby. The roughness of the surface of the protective film is so extremely small that the line pattern detecting capability of the mouse is maintained unchanged.

I claim:

1. An optical mouse comprising:
   a first line pattern provided on a first surface for detecting one direction of movement, said first line pattern comprising parallel lines made of a material which can be optically detected;
   a second line pattern provided on a second surface spaced a predetermined distance from said first surface for detecting movement in a direction substantially perpendicular to said one direction, said second line pattern comprising parallel lines made of a material which can be optically detected;
   means for illuminating said first and second line patterns; and
   line pattern reading means comprising optical means and detecting element means for separately detecting said first and second line patterns.

2. The optical mouse as claimed in claim 1, wherein lines of said first line pattern are substantially perpendicular to lines of said second line pattern.

3. The optical mouse as claimed in claim 1, wherein said first line pattern is provided on an upper surface of a transparent substrate, and said second line pattern is provided on a lower surface of said transparent substrate.

4. The optical mouse as claimed in claim 1, further comprising a transparent film having said first line pattern laid on an upper surface of a transparent substrate, and a transparent film having said second line pattern laid on a lower surface of said transparent substrate.

5. The optical mouse as claimed in claim 1, wherein said first line pattern is partially transparent, and said line pattern reading device is provided on the side of said first line pattern.

6. The optical mouse as claimed in claim 5, wherein said first line pattern comprises dotted minute reflex points.

7. The optical mouse as claimed in claim 1, wherein a width of each of said parallel lines of said first line pattern is smaller than a distance between a first one of said parallel lines and a second one of said parallel lines adjacent to said first one, and said line pattern reading means is provided on the side of said first line pattern.

8. The optical mouse as claimed in claim 7, wherein said line pattern is partially transparent.

9. The optical mouse as claimed in claim 1, further comprising a light absorbing layer provided on a side of said second line pattern provided on said second surface facing away from said first line pattern provided on said first surface.

10. The optical mouse as claimed in claim 1, wherein said optical means comprises a first optical system focused on said first line pattern, and a second optical system which is focused on said second line pattern.

11. A mouse pad for an optical mouse having an infrared ray source and detecting elements for separately detecting a first line pattern on said pad composed of light-reflecting parallel lines provided on a first surface of a transparent substrate for detecting movement in one direction, and a second line pattern of said pad composed of light-reflecting parallel lines provided on a second surface of said substrate which is opposite to said first surface for detecting movement in another direction different from said one direction, said substrate being made of a material having a transmissivity for visible rays smaller than for infrared rays.

12. The mouse pad as claimed in claim 11, wherein said transparent substrate is made of acrylic resin.

13. The mouse pad as claimed in claim 11, wherein said first surface is an upper surface of said substrate, and said first line pattern on said upper surface of said substrate is covered with a protective film whose surface is microscopically uneven.

14. The mouse pad as claimed in claim 11, wherein said material of which said substrate is made has a transmissivity for visible rays of about 20% for rays in the visible region of from about 400 nm to about 700 nm in wavelength, and a transmissivity of about 90% or more for rays in the infrared region higher than about 770 nm in wavelength.

* * * * *